//
3,829,439
PROCESS FOR PREPARING COMPOUNDS OF THE
BENZOTHIOXANTHENE SERIES

Ernst Spietschka, Oberauroff, Taunus, and Josef Landler, Hofheim, Taunus, Germany, assignors to Farbwerke Hoechst Aktiengesellschaft vormals Meister Lucius & Bruning, Frankfurt am Main, Germany
No Drawing. Filed July 10, 1972, Ser. No. 270,257
Claims priority, application Germany, July 10, 1971,
P 21 34 518.6
Int. Cl. C07d 65/16
U.S. Cl. 260—328    9 Claims

ABSTRACT OF THE DISCLOSURE

Process for preparing compounds of the benzothioxanthene series, wherein compounds of the 1-(2'-aminophenylmercapto)naphthalene series or of the 1-phenylmercapto-8-amino-naphthalene series are reacted in a N,N-dialkylated acid amide with compounds that yield nitrosyl groups and the diazonium compounds so obtained are heated in the presence of copper or copper salts. This process is suited for all compounds which contain the benzothioxanthene ring, independently of their substituents. The products obtained by this process have a markedly higher purity and are obtained in a higher yield as compared to other processes.

---

A series of compounds which contain the ring structure of benzothioxanthene of the formula

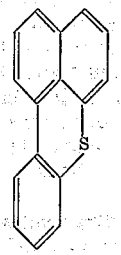

(1)

have gained increasing importance as disperse dyestuffs and as fluorescing dyestuffs or as precursor products for these dyestuffs. They can be obtained by diazotizing amines of the formulae

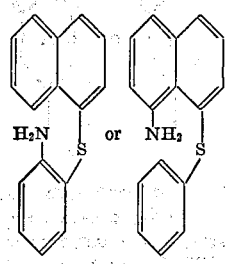

(2)    (3)

which contain suitable substituents, in dilute acetic acid and by heating in the presence of copper or copper salts. However, this treatment at the boil also leads, in addition to the desired products of the benzothioxanthene series, to side-products as for example the hydroxy compounds formed by the decomposition of the diazonium compound. However, for obtaining optimum fluorescence it is necessary that these dyestuffs are chemically very pure (Th. Förster, Fluoreszenz organischer Verbindugen, 1951, page 181). The same applies to the brilliancy of dyeings produced with such dyestuffs. For this reason, it is necessary to purify the benzothioxanthene compound according to the known process additionally by extraction or recrystallization from an organic solvent.

Now, we have found that compounds of the benzothioxanthene series can be obtained by a single reaction step and with a high degree of purity by reacting compounds of the 1-(2'-aminophenylmercapto)-naphthalene series of the formula (2) or compounds of the 1-phenyl-mercapto-8-amino-naphthalene series of the formula (3) in N,N-dialkylated acid amides, with compounds that yield nitrosyl groups and heating the diazonium compounds so obtained, optionally in the presence of copper or copper salts.

For carrying out the process of the invention, the starting compounds of the formulae (2) or (3) are dissolved or suspended in a N,N-dialkylated acid amide, for example dimethylformamide, N-methylpyrrolidone or phosphoric acid tris-dimethylamide. The type and the quantity of the N,N-dialkylated acid amide is determined by the solubility of the final product; best results are obtained in general with about the 5–10-mold quantity of solvent. The solution or suspension is combined with molar amounts of a diazotizing agent splitting-off nitrosyl groups, for example nitrosyl chloride or nitrosyl-sulfuric acid. The temperature used is in general in the range of from −10° C. to +10° C. Sometimes, a small excess of the diazotizing agent may be necessary to obtain complete diazotization. When diazotization is completed, a small amount, about 0.5% to 5%, of copper salts or copper powder is added and the reaction mixture is heated to temperatures in the range of from about 50° C. to 115° C. until reaction is completed. The quantity of copper salt and temperature required for the ring closure depend on the reactivity of the diazonium compound. The addition of copper or copper salt may be omitted if the acid formed from the diazotizing agent is bound by a base, for example potassium carbonate.

The process of the invention is in general suited for preparing all compounds which contain the benzothioxanthene ring, independently of the type of its substituents. Such compounds are described in French Pats. 1,444,489, 1,470,793, 1,488,113, 1,489,487, 1,469,893, 2,089,619, 2,089,618 and 2,093,659.

The products obtained according to the process of the invention are distinguished by a markedly higher purity and they are obtained with a higher yield as compared to the yield of other processes. In addition thereto, the N,N-dialkylated acid amides used can be easily regenerated by distillation in which the copper compounds remain in the sump in highly concentrated form and need not, as when using dilute acetic acid as solvent, be removed from the mother liquors by a separate precipitating process in order to prevent contamination of the waste waters.

A further advantage is that a single boiler is required for the diazotization and ring closure, as compared to the process in which the dilute acetic acid is used. Furthermore, the reaction volumes are distinctly smaller, whereby the spacetime yields are more favorable.

It is surprising that upon heating of the diazonium compounds from amines of the formula (2) or (3) in N,N-dialkylated acid amides, ring closure takes place, since it is know from German Pats. 901,175 and 905,014, that diazonium compounds easily undergo reduction when boiled in dimethylformamide.

The following Examples illustrate the invention:

EXAMPLE 1

35.3 Parts by weight of 3-(2'-aminophenylmercapto)-benzanthrone were introduced into 170 parts by weight of dimethylformamide and to this mixture, 37 parts by weight of nitrosylsulfuric acid (42%) were added dropwise at −5° to 0° C., while stirring. After half an hour, cooling was switched off and the whole was stirred for 2½ hours at room temperature. Then, 0.5 part by weight of copper sulfate cryst. (CuSO$_4$.5H$_2$O) was added. The reaction mixture was slowly heated to 110° C. to 115° C. until the reaction was completed and then after-stirred for 3 hours. After cooling, the cyclization product was filtered-off with suction and washed with dimethylformamide until the effluent showed a light red colour. It was then washed with water until it was free from dimethylformamide and dried at 110° C. in a drying chamber.

The dyestuff obtained in this manner, which corresponded to the formula

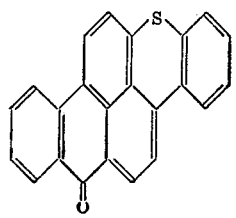

showed an extinction value, measured by photometry at 510 nm, which corresponded to 99–100% of the extinction value of a chemically pure product. Under the same measuring conditions, the extinction value of this dyestuff was only 68%, if the dyestuff had been prepared according to the method described in German Pat. 1,293,-939. A similarly pure product was obtained when allowing nitrosyl-sulfuric acid to run in, while cooling, into dimethylformamide and then introducing 3-(2'-aminophenylmercapto)-benzanthrone. Instead of nitrosyl-sulfuric acid, the equivalent amount of nitrosyl-chloride can also be used.

EXAMPLE 2

35.3 Parts by weight of 3-(2'-aminophenylmercapto)-benzanthrone were introduced in 175 parts by weight of N-methylpyrrolidone and to this mixture, 37 parts by weight of nitrosyl-sulfuric acid (42%) were added dropwise, while stirring, at —10° to 0° C. Cooling was then switched off and stirring was continued for 3 hours at room temperature. To complete the reaction, the reaction mixture was slowly heated to 110° to 115° C. and stirred for 3 hours at this temperature. After cooling, the cyclization product was filtered-off with suction and washed with N-methylpyrrolidone until the effluent showed a light red colour and then dried at 100° C. in a drying chamber. The dyestuff obtained in this manner showed, in comparison to a chemically pure product, an extinction value of 99–100%, measured by photometry at 510 nm. On the other hand, the extinction value of this dyestuff was only 68% of that of a chemically pure product, if the dyestuff had been prepared according to the method indicated in German Pat. 1,293,939.

A similarly good product was obtained when allowing nitrosyl-sulfuric acid to run in, while cooling, into N-methylpyrrolidone and subsequently introducing the 3-(2'-aminophenylmercapto)-1,9-benzanthrone. Phosphoric acid tris-dimethylamide can also be used as solvent with the same good success.

EXAMPLE 3

32.1 Parts by weight of 4-(2'-aminophenylmercapto)-naphthalic acid anhydride were introduced into 320 parts by weight of N-methylpyrrolidone and to this reaction mixture there were added dropwise, while stirring, at —5° to +5° C., 37 parts by weight of nitrosyl-sulfuric acid (42%). After half an hour, cooling was switched off and stirring was continued for 2½ hours at room temperature. The reaction mixture was slowly heated to 110 to 115° C. until the reaction was completed and then after-stirred for 3 hours. After cooling, the cyclization product was filtered-off with suction and washed with N-methylpyrrolidone until the effluent showed a light yellow colour. The product was then washed with water until it was free from solvent and dried at 100° C. in a drying chamber.

The dyestuff obtained in this manner and which corresponded to the formula

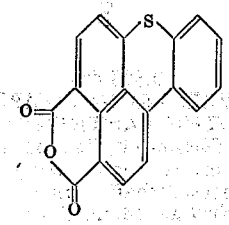

showed an extinction value of 96–98%, measured by photometry at 465 nm.

The extinction value of this dyestuff was only 85% of that of a chemically pure product, if the dyestuff had been prepared according to the method described in German Pat. 1,297,259.

EXAMPLE 4

32.1 Parts by weight of 4-(2'-aminophenylmercapto)-naphthalic acid anhydride were introduced into 320 parts by weight of dimethylformamide and to this mixture there were added dropwise, while stirring, at —5° to 0° C. 37 parts by weight of nitrosyl-sulfuric acid (42%). Then, 55 parts by weight of potassium carbonate were added and after half an hour cooling was switched off. Stirring was continued for 2½ hours at room temperature and in order to complete the reaction, the reaction mixture was slowly heated to 100°–115° C. and kept at this temperature for 3 hours. After cooling, the cyclization product was filtered off with suction and washed with dimethylformamide until the effluent was light yellow. The product was then washed with water until it was free from salt and dried at 100° C. in a drying cabinet. The dyestuff obtained in this manner showed an extinction value of 97%, measured by photometry at 465 nm.

A similarly good product was obtained by allowing the nitrosyl-sulfuric acid to run in, while cooling, into dimethylformamide, then introducing the 4-(2'-aminophenylmercapto)-naphthalic acid anhydride and adding, after half an hour, the potassium carbonate.

We claim:
1. In a process for preparing a benzothioxanthene by diazotizing a compound essentially having the structure

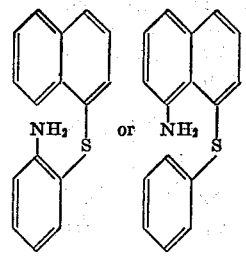

and heating the resulting diazonium salt, the improvement which consists in diazotizing said compound in an N,N-dialkylated acid amide at a temperature in the range of from —10° to +10° C. and heating the resulting diazonium compound to a temperature in the range of 50° C. to 115° C.

2. The process defined in claim 1 in which the amide is dimethyl formamide.

3. The process defined in claim 1 in which the amide is N-methylpyrrolidone.

4. The process defined in claim 1 in which the amide is phosphoric acid tris-dimethylamide.

5. Process defined in claim 1 wherein about 0.5 to 5% copper powder or copper sulfate are added to the reaction mixture after diazotization.

6. Process defined in claim 1 wherein a base is added to the reaction mixture after diazotization.

7. Process defined in claim 1 wherein potassium carbonate is added to the reaction mixture after diazotization.

8. A process which comprises diazotizing 3-(2'-aminophenylmercapto)-benzanthrone with nitrosyl chloride or nitrosyl sulfuric acid in an N,N-dialkylated acid amide at a temperature in the range of from −10° C. to +10° C. and heating the resulting diazonium compound to a temperature in the range of 50° C. to 115° C.

9. A process which comprises diazotizing 4-(2'-aminophenylmercapto)-naphthalic acid anhydride with nitrosyl chloride or nitrosyl sulfuric acid in an N,N-dialkylated acid amide at a temperature in the range of from −10° C. to +10° C. and heating the resulting diazonium compound to a temperature in the range of 50° C. to 115° C.

References Cited

UNITED STATES PATENTS 3,367,937   2/1968   Fuchs et al. _____ 260—281

HENRY R. JILES, Primary Examiner

C. M. S. JAISLE, Assistant Examiner